United States Patent Office 3,547,888
Patented Dec. 15, 1970

3,547,888
AMORPHOUS TERPOLYESTERS HAVING HIGH IMPACT STRENGTH
Kashinath S. Sardessai, Menlo Park, and Michel E. Mullier, Princeton Junction, N.J., assignors to Mobil Oil Corporation, a corporation of New York
No Drawing. Filed June 5, 1967, Ser. No. 643,395
Int. Cl. C08g 17/08
U.S. Cl. 260—75
3 Claims

ABSTRACT OF THE DISCLOSURE

Amorphous terpolyester having a high heat distortion temperature and a high impact strength are prepared by copolyesterification of three monomers. One monomer is terephthalic acid or an ester thereof and another is 1,4-cyclohexane dimethanol (cis, trans, or a mixture of cis and trans isomers). The third monomer is a dicarboxylic acid having at least two ($C_4$–$C_6$) carbocyclic rings, or an ester thereof. These amorphous copolyesters become crystalline when heated at about 100° C. and lose impact strength. Thus, they can be used for making molded products which will not be subjected to temperatures above usual ambient temperatures.

BACKGROUND OF THE INVENTION

Field of the invention

This invention relates to terpolyesters and their preparation. It is more particularly concerned with amorphous terpolyesters having high heat distortion temperature and high impact strength made from the copolyesterification of three monomers.

Description of the prior art

U.S. Pat. No. 2,901,466 is directed to copolyesters of 1,4-cyclohexane dimethanol with one or more dicarboxylic acids. These polymers are crystalline and exhibit a crystalline melting point. They do not appear to have high impact properties.

SUMMARY OF THE INVENTION

It is the discovery of this invention that terpolyesters can be produced that are amorphous. They retain high impact properties, unless subjected to temperatures of about 100° C. or higher.

Accordingly, the present invention provides terpolyesters of terephthalic acid, 1,4-cyclohexane dimethanol, and a dicarboxylic acid having two ($C_4$–$C_6$) carbocyclic rings.

DESCRIPTION OF SPECIFIC EMBODIMENTS

Two monomer components of the terpolyesters of this invention are terephthalic acid and 1,4-cyclohexane dimethanol (CHDM). Within the contemplation of this invention the terephthalic acid can be used as such or as a lower ($C_1$–$C_4$) alkyl diester. The 1,4-cyclohexane dimethanol reactant (CHDM) can be in the cis or trans form or it can be a mixture of cis and trans isomers.

The third component of the terpolyester of this invention must be a dicarboxylic acid containing two $C_4$–$C_6$ carbocyclic groups. They can be acids having the general formula:

HOOC—A—X—B—COOH wherein A and B are same or dissimilar carbocyclic groups containing 4–6 carbon atoms, such as cyclobutylene, cyclopentylene, cyclopentenylene, cyclohexylene, cyclohexenylene and phenylene; and X is a divalent linking group, such as $$-SO_2-,\ -SO_3-,\ -O-,\ -S-,\ \text{and}\ R\overset{|}{\underset{|}{C}}R'$$

(R and R' are $C_1$–$C_3$ alkyl or phenyl). It is also within the contemplation of this invention to use dicarboxylic acids having non-linked carbocyclic groups, i.e., directly joined groups, such as diphenyl dicarboxyl acids and dicyclohexyl dicarboxylic acids, and fused groups, such as naphthalene dicarboxylic acids. It is also contemplated to use dicarboxylic acids in which the carbocyclic groups are joined by a linking group that is fused to one of the carbocyclic groups, such as phenylindane dicarboxylic acids.

As in the case of terephthalic acid, the third monomer component can be used as the acid or as the di-lower alkyl ($C_1$–$C_4$) ester. Typical dicarboxylic acids (and the esters and "pre-polymers" thereof) used as the third monomer component are: p,p'-sulfonyldibenzoic acid; m,p'-sulfonyldibenzoic acid; m,m'-sulfonyldibenzoic acid; p-carboxyphenyl, p'-carboxybenzenesulfonate; m-carboxyphenyl, p'-carboxybenzenesulfonate; m,p'-isopropylidenedibenzoic acid; p,p'-isopropylidenedibenzoic acid; 2,2-di-(p - carboxyphenyl) butane; 3,3 - di(p - carboxyphenyl) pentane; 2,6-naphthalenedicarboxylic acid; 1,8-naphthalenedicarboxylic acid; p,p'-diphenyldicarboxylic acid; m,p'-diphenyldicarboxylic acid; 4,4'-dicyclohexanedicarboxylic acid; and various other acids having the following representative formulae:

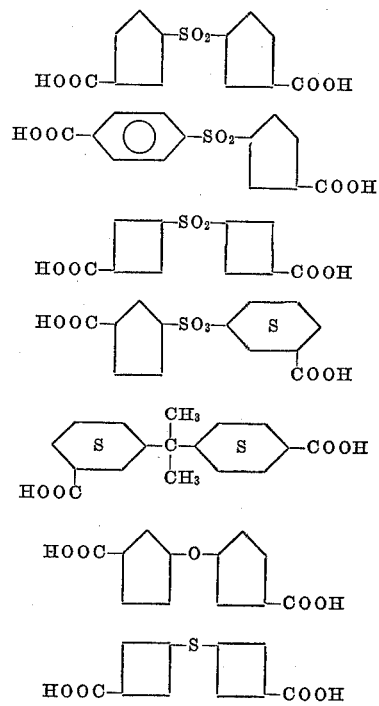

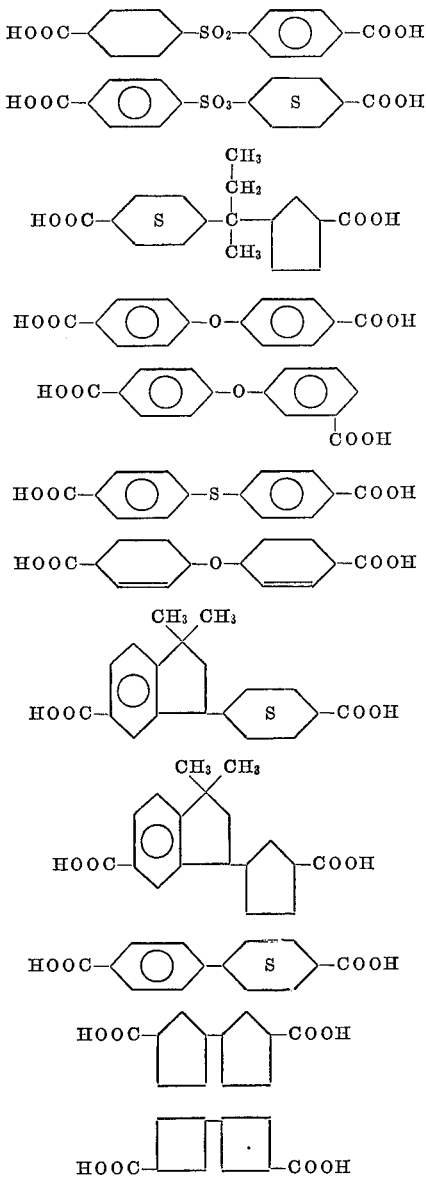

If desired these dicarboxylic acids can contain ring substituents which will not interfere with the copolyesterification reaction, such as alkyl, halogen, and aryl.

The molar proportions of acid monomer components used to prepare the copolyesters of this invention can be varied to some extent. In the finished polymer dicarboxylic acids and diol will be present in a 1:1 molar ratio. Thus, the acid components and the CHDM will be present in the final copolyester in the following ranges of mole percent of acid and of mole percent of CHDM:

(a) First component—TPA=[1] 15–85
(b) Third componnt—dicarboxylic acid=[1] 85–15
(c) Second component—CHDM=100 mole percent

[1] Mole percent of acids.

The copolyesterification reaction can be advantageously facilitated by the employment of a catalyst. The best catalyst for each reaction is determined by the nature of the reactants. Generally, when an alkyl ester of the acidic compound is being employed, an ester interchange type of catalyst is to be preferred. Numerous patents have issued in the last few years describing numerous advantageous catalysts which can be employed. Various techniques as to the use of the catalysts are well known in the art. For example, if the free acid is being reacted with the free CHDM, a catalyst need not be added until after the preliminary condensation has gotten under way.

The reaction is generally begun in the presence of an excess of the CHDM and initially involves heating to a temperature sufficient to cause a preliminary condensation followed by the evaporation of excess CHDM. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly polymeric condensation product produced as just described can be cooled, pulverized, and the powder heated to a temperature somewhat less than that employed during the last stage of the molten phase polymerization, thereby avoiding coagulation of the solid particles. The solid phase polymerization is advantageously conducted until the desired degree of polymerization is achieved. The solid phase polymerization, among other things, results in a higher degree of polymerization without the accompanying degradation, which frequently takes place when continuing the last stage of the melt phase polymerization at a temperature high enough to achieve the desired degree of polymerization. The solid phase process is advantageously conducted with agitation employing an inert atmosphere at either normal atmospheric pressure or under a greatly reduced pressure.

The amorphous terpolyesters of this invention can be molded to form various shaped articles, with proper selection of the molding method. Methods using a cold mold, such as in injection molding, are successful in the production of shaped articles having high impact resistance. On the other hand, methods utilizing hot molds, such as in compression molding, are less satisfactory. As set forth hereinbefore, the terpolyesters tend to crystallize when heated at about 100° C. Thus, while cooling a hot molded article, the solid article will be subjected to elevated temperatures and will tend to crystallize. In this form the article will not have impact resistance.

EXAMPLE 1

A mixture of dimethyl terephthalate (72.7 g., 0.37 mole), p,p'-sulfonyl dibenzoic acid butyl ester (52.3 g., 0.125 mole) and CHDM (129.8 g., 0.90 mole) and calcium acetate (0.42 g.) was placed ina polyesterification reaction vessel. The CHDM was 70% trans-30% cis. The mixture was heated at 200° C. for 30 minutes. Ten drops of tetrabutyl titanate were added and the reaction mixture was heated to 250° C. during the course of 10 minutes. After keeping the reaction mixture at 250° C. for 45 minutes the temperature of the oil baths was raised to 300° C. (15 minutes). In the course of 30 minutes at 300° C., the reaction mixture became very viscous. The reaction system was then put under reduced pressure (0.1 mm.). The reaction mixture was extremely viscous and could not be stirred. After bringing the reaction mixture to atmospheric pressure, the clear, hard polymer was removed from the reaction flasks. The RSV of the polymer was 0.89 at 23° in the solvent system of a 50:50 weight percent phenol-tetrachloroethane. The injection molded bar showed Izod impact values (ASTM D256–56) in the range of 19.0 ft. lbs./inch. notch. This polyester showed crystalline nature (by X-ray) on heating and the impact properties were not retained once the polymer crystallized. $T_g$ of the copolyester is 115–116° C. The polyester crystallized on compression molding at 450° F.

EXAMPLES 2–5

Following the procedure set forth in Example 1, terpolyesters were prepared using other dicarboxylic acids in place of the p,p'-sulfonyl dibenzoic acid. Pertinent data and test results are set forth in the table.

TABLE

| Example No. | Other comonomer | Dimethyl terephthalate | Glycol CHDM [1] | RSV | $T_g$, °C. | Impact, ft. lbs./inch notch |
|---|---|---|---|---|---|---|
| 2 | p,p'-isopropylidene dibenzoic acid dimethyl ester, 39.05 g., 0.125 mole. | 72.82 g., 0.375 mole | 129.78 g., 0.90 mole | 0.83 | 104 | 24–26 |
| 3 | p-Carboxyphenyl, p'-carboxy benzene sulfonate, 43.78 g., 0.125 mole. | do | do | 0.68 | 101 | 5–14 |
| 4 | 2,6-naphthalene dicarboxylic acid dimethyl ester, 30.54 g., 0.125 mole. | do | do | 0.89 | 102 | 2.4–2.6 |
| 5 | 1,3,3-trimethyl-1-phenylindane-4',6-dicarboxylic acid dimethyl ester, 44.05 g., 0.124 mole. | do | do | 0.79 | 104 | 1.7–2 |

NOTE.—Test specimens prepared by injection molding. Number refers to the variation on four test specimens.

[1] 70% trans, 30% cis.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. Moldable terpolyesters, amorphous at temperatures up to about 100° C., of components consisting essentially of (A) terephthalic acid, (B) cyclohexane dimethanol, and (C) a dicarboxylic acid selected from the group consisting of p,p'-isopropylidenedibenzoic acid; p-carboxyphenyl, p'-carboxybenzene-sulfonate; and 1,3,3-trimethyl-1-phenylindane-4',6-dicarboxylic acid; wherein 15–85 mole percent of the acid components (A) and (C) is terephthalic acid and 85–15 mole percent of the acid components is (C).

2. The terpolyester defined in claim 1 wherein (C) is p,p'-isopropylidenedibenzoic acid.

3. The terpolyester defined in claim 1 wherein (C) is p-carboxyphenyl, p'-carboxybenzenesulfonate.

References Cited
UNITED STATES PATENTS

| 2,744,094 | 5/1956 | Caldwell | 260—75S |
| 3,008,934 | 11/1961 | Wielicki et al. | 260—75 |
| 3,374,201 | 3/1968 | Wiener | 260—75 |

WILLIAM H. SHORT, Primary Examiner

L. P. QUAST, Assistant Examiner

U.S. Cl. X.R.

260—47